(12) United States Patent
Kim et al.

(10) Patent No.: US 12,518,180 B2
(45) Date of Patent: Jan. 6, 2026

(54) METHOD, SERVICE SERVER, AND COMPUTER-READABLE MEDIUM FOR SELECTIVELY EXTRACTING DATA FOR LABELING

(71) Applicant: SELECT STAR, INC., Daejeon (KR)

(72) Inventors: Seyeob Kim, Seoul (KR); BaRom Kang, Seoul (KR); Namgil Kim, Bucheon-si (KR)

( * ) Notice: Subject to any disclaimer, the term of this patent is extended or adjusted under 35 U.S.C. 154(b) by 606 days.

(21) Appl. No.: 17/994,276

(22) Filed: Nov. 26, 2022

(65) Prior Publication Data

US 2024/0144040 A1 May 2, 2024

(30) Foreign Application Priority Data

Oct. 28, 2022 (KR) .................... 10-2022-0141672

(51) Int. Cl.
*G06N 5/022* (2023.01)
*G06V 10/764* (2022.01)
*G06V 10/77* (2022.01)
*G06V 10/771* (2022.01)
*G06V 10/774* (2022.01)
*G06V 20/70* (2022.01)

(52) U.S. Cl.
CPC .......... *G06N 5/022* (2013.01); *G06V 10/764* (2022.01); *G06V 10/771* (2022.01); *G06V 10/7715* (2022.01); *G06V 10/774* (2022.01); *G06V 20/70* (2022.01)

(58) Field of Classification Search
CPC ..................................................... G06N 5/022
See application file for complete search history.

(56) References Cited

U.S. PATENT DOCUMENTS

| | | | |
|---|---|---|---|
| 9,990,687 B1 * | 6/2018 | Kaufhold | G06N 3/045 |
| 11,537,506 B1 * | 12/2022 | Dasgupta | G06N 3/10 |
| 2009/0282063 A1 * | 11/2009 | Shockro | G06F 3/0483 |
| 2014/0068487 A1 * | 3/2014 | Steiger | A61B 5/7275 |
| | | | 715/771 |
| 2018/0144518 A1 * | 5/2018 | Vlassis | G06F 17/18 |
| 2022/0083901 A1 * | 3/2022 | Khanna | G06N 20/10 |
| 2022/0277219 A1 * | 9/2022 | Tora | G06N 3/10 |
| 2023/0306761 A1 * | 9/2023 | Sirbulescu | G06V 10/12 |

OTHER PUBLICATIONS

Kim Sun Jin et al., KR20210152269A, English machine translation, 36 pages, published Dec. 15, 2021 (Year: 2021).*

* cited by examiner

*Primary Examiner* — Barbara M Level
(74) *Attorney, Agent, or Firm* — Youngil Lee

(57) ABSTRACT

The present invention relates to a method, a service server, and a computer-readable medium for selectively extracting data for labeling, and more particularly, to a method, a service server, and a computer-readable medium for selectively extracting data for labeling, capable of selectively providing data for effectively training a machine learning model that is desired to be achieved by a user by deriving a plurality of feature vectors for a plurality of data included in an original dataset, applying a preset rule to the feature vectors to select a preset number of feature vectors among the feature vectors, and plotting the selected feature vectors and unselected feature vectors on a plane of three or less dimensions to provide a plotting result to the user.

6 Claims, 11 Drawing Sheets

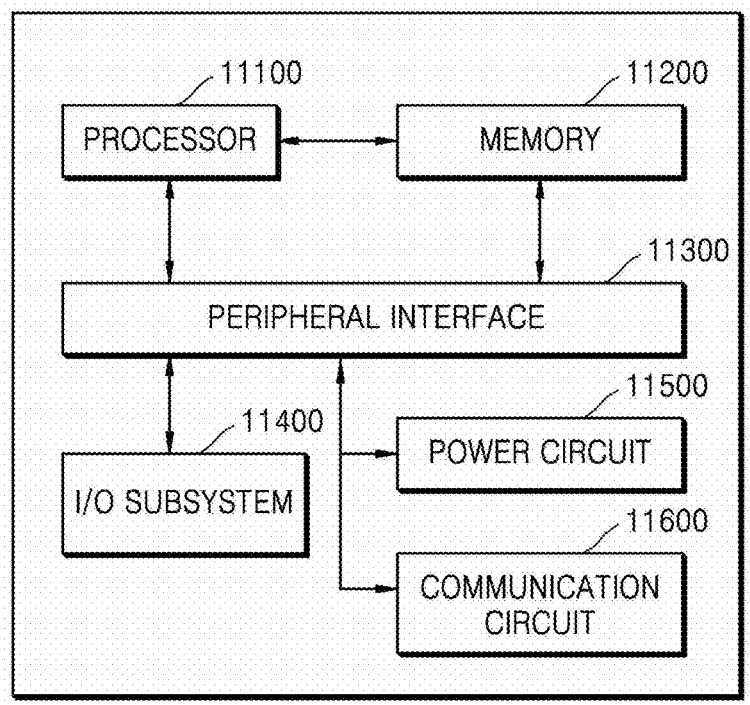

METHOD, SERVICE SERVER, AND COMPUTER-READABLE MEDIUM FOR SELECTIVELY EXTRACTING DATA FOR LABELING

BACKGROUND OF THE INVENTION

1. Field of the Invention

The present invention relates to a method, a service server, and a computer-readable medium for selectively extracting data for labeling, and more particularly, to a method, a service server, and a computer-readable medium for selectively extracting data for labeling, capable of selectively providing data for effectively training a machine learning model that is desired to be achieved by a user by deriving a plurality of feature vectors for a plurality of data included in an original dataset, applying a preset rule to the feature vectors to select a preset number of feature vectors among the feature vectors, and plotting the selected feature vectors and unselected feature vectors on a plane of three or less dimensions to provide a plotting result to the user.

2. Description of the Related Art

Recently, as various services based on artificial intelligence researches and artificial intelligence that is developed appear, efforts have been made to develop more advanced artificial intelligence models. In detail, in recent years, researches have been conducted to improve a structure of a machine learning model and improve an amount and quality of learning data used for training the machine learning model.

In general, in order to collect the learning data, the learning data may be constructed through a process for processing a large amount of raw data retained by companies to allow the raw data to be suitable for the training. For example, in order to train a machine learning model for identifying a person included in an image, a region of the person included in each of the raw data may be labeled to construct learning data for the machine learning model.

Meanwhile, since an amount of raw data retained by a company is very large, which is up to millions, not tens, it may be difficult for the company to process the raw data into learning data. In order to solve the above problem, conventionally, crowdsourcing has been used to provide an operation for processing the raw data into the learning data to a plurality of operators, and provide a reward for the operation to the operator, so that a large amount of learning data may be rapidly constructed.

However, the crowdsourcing may only effectively shorten a time required to construct a large amount of learning data, so that it may be difficult to improve quality of the learning data constructed through the crowdsourcing. As in the example described above, when there are more images that do not include a person than images that include a person, or majority of images include a person of a specific race in learning data for training the machine learning model for identifying a person, performance degradation of the machine learning model that has been trained with the learning data is inevitable. Therefore, in order to resolve the above problem, learning data with excellent quality is required, and in order to construct the learning data with excellent quality, it is important to select only valid data from a large amount of raw data, which is the basis of the learning data. In addition, since an amount of raw data retained by a company is very huge, in order to reduce a time and a cost for constructing learning data with a large amount of raw data, a process for selecting raw data for constructing learning data rather than a process for constructing learning data with entire raw data is required.

Meanwhile, since the raw data is simply labeled to construct the learning data in the case of the crowdsourcing described above, the process for selecting the raw data has not been performed.

As described above, in order to effectively train a machine learning model, and in order to reduce a time required for constructing learning data and performing training with the learning data, there is a demand to develop a method for selecting raw data that are suitable for training a machine learning model before constructing learning data by performing a labeling operation on raw data.

SUMMARY OF THE INVENTION

The present invention relates to a method, a service server, and a computer-readable medium for selectively extracting data for labeling, and more particularly, an object of the present invention is to provide a method, a service server, and a computer-readable medium for selectively extracting data for labeling, capable of selectively providing data for effectively training a machine learning model that is desired to be achieved by a user by deriving a plurality of feature vectors for a plurality of data included in an original dataset, applying a preset rule to the feature vectors to select a preset number of feature vectors among the feature vectors, and plotting the selected feature vectors and unselected feature vectors on a plane of three or less dimensions to provide a plotting result to the user.

To achieve the object described above, according to one embodiment of the present invention, there is provided a method for selectively extracting data for labeling, which is performed by a service server including at least one processor and at least one memory, the method including: a feature vector derivation step of inputting an original dataset including N data (where N is a natural number that is greater than or equal to 2) provided by a user to a feature embedding model so as to derive a feature vector for each of the N data; and a feature vector selection step of applying a preset rule to the N feature vectors derived in the feature vector derivation step to select M feature vectors (where M is a natural number that is less than N) among the N feature vectors.

According to one embodiment of the present invention, the feature embedding model may correspond to one encoder corresponding to a data type of the original dataset in a machine learning model including a plurality of encoders corresponding to a plurality of data types to derive feature vectors for data of the data types, respectively.

According to one embodiment of the present invention, the feature vector selection step may include: a reference feature vector selection step of selecting a reference feature vector for selecting the M feature vectors among the N feature vectors; and a region selection step of classifying a plurality of regions based on the reference feature vector, and selecting some of a plurality of feature vectors included in the region for each region.

According to one embodiment of the present invention, the method for selectively extracting the data for the labeling may further include: a dimension reduction step of reducing dimensions of the M feature vectors selected through the feature vector selection step and remaining (N-M) feature vectors that are not selected to three or less dimensions; and a feature vector plotting step of separately displaying the M feature vectors with the reduced dimensions and the (N-M) feature vectors with the reduced dimensions on a plane of the three or less dimensions.

According to one embodiment of the present invention, the feature vector plotting step may include a visualization interface provision step of providing a visualization interface in which the plane of the three or less dimensions including the N feature vectors with the reduced dimensions is visually displayed to a terminal of the user, and the visualization interface displayed on the terminal of the user may be configured to display the M feature vectors with the reduced dimensions in a first color, and display the (N-M) feature vectors with the reduced dimensions in a second color.

According to one embodiment of the present invention, when the user selects one feature vector among the N feature vectors with the reduced dimensions, which are visually displayed, the visualization interface displayed on the terminal of the user may be configured to display data corresponding to the selected feature vector.

According to one embodiment of the present invention, when the user performs an input for changing a selection state for one feature vector among the N feature vectors with the reduced dimensions, which are visually displayed, the visualization interface displayed on the terminal of the user may be configured to change a color previously displayed for the one feature vector into a color that is different from the color previously displayed for the one feature vector among the first color and the second color.

To achieve the object described above, according to one embodiment of the present invention, there is provided a service server including at least one processor and at least one memory to perform a method for selectively extracting data for labeling, wherein the service server is configured to perform: a feature vector derivation step of inputting an original dataset including N data (where N is a natural number that is greater than or equal to 2) provided by a user to a feature embedding model so as to derive a feature vector for each of the N data; and a feature vector selection step of applying a preset rule to the N feature vectors derived in the feature vector derivation step to select M feature vectors (where M is a natural number that is less than N) among the N feature vectors.

To achieve the object described above, according to one embodiment of the present invention, there is provided a computer-readable medium for implementing a method for selectively extracting data for labeling, which is performed by a service server including at least one processor and at least one memory, wherein the computer-readable medium includes computer-executable instructions for allowing the service server to perform: a feature vector derivation step of inputting an original dataset including N data (where N is a natural number that is greater than or equal to 2) provided by a user to a feature embedding model so as to derive a feature vector for each of the N data; and a feature vector selection step of applying a preset rule to the N feature vectors derived in the feature vector derivation step to select M feature vectors (where M is a natural number that is less than N) among the N feature vectors.

According to one embodiment of the present invention, a preset number of data may be selected among a plurality of data included in an original dataset to provide the selected data to a user, so that the user can selectively provide data for constructing learning data required to train a machine learning model.

According to one embodiment of the present invention, in order to select the preset number of data among the data included in the original dataset, relations among feature vectors for the data may be considered to select the preset number of data, so that the data can be selected more effectively.

According to one embodiment of the present invention, dimensions of feature vectors for the selected data and feature vectors for unselected data among the data may be reduced, and the feature vectors with the reduced dimensions may be displayed on a plane of three or less dimensions, so that the user can easily and visually recognize distribution of the selected data and the unselected data.

According to one embodiment of the present invention, a visualization interface displayed on a terminal of the user may include the plane of the three or less dimensions including the feature vectors with the reduced dimensions, and mutually different colors may be applied to the feature vectors with the reduced dimensions for the selected data and the feature vectors with the reduced dimensions for the unselected data on the plane, so that the user can recognize the distribution of the selected data more effectively.

According to one embodiment of the present invention, the visualization interface displayed on the terminal of the user may include the plane of the three or less dimensions including the feature vectors with the reduced dimensions, and the user may select the feature vector on the plane to cancel selection of a selected feature vector or to select an unselected feature vector, so that the user can arbitrarily change the selected data.

According to one embodiment of the present invention, the visualization interface displayed on the terminal of the user may include the plane of the three or less dimensions including the feature vectors with the reduced dimensions, and when the user selects one feature vector on the plane, data for the feature vector may be displayed on the terminal of the user, so that the user can easily recognize the selected data.

BRIEF DESCRIPTION OF THE DRAWINGS

FIG. 11 schematically shows internal components of the computing device according to one embodiment of the present invention.

DETAILED DESCRIPTION OF THE INVENTION

Figure 1:
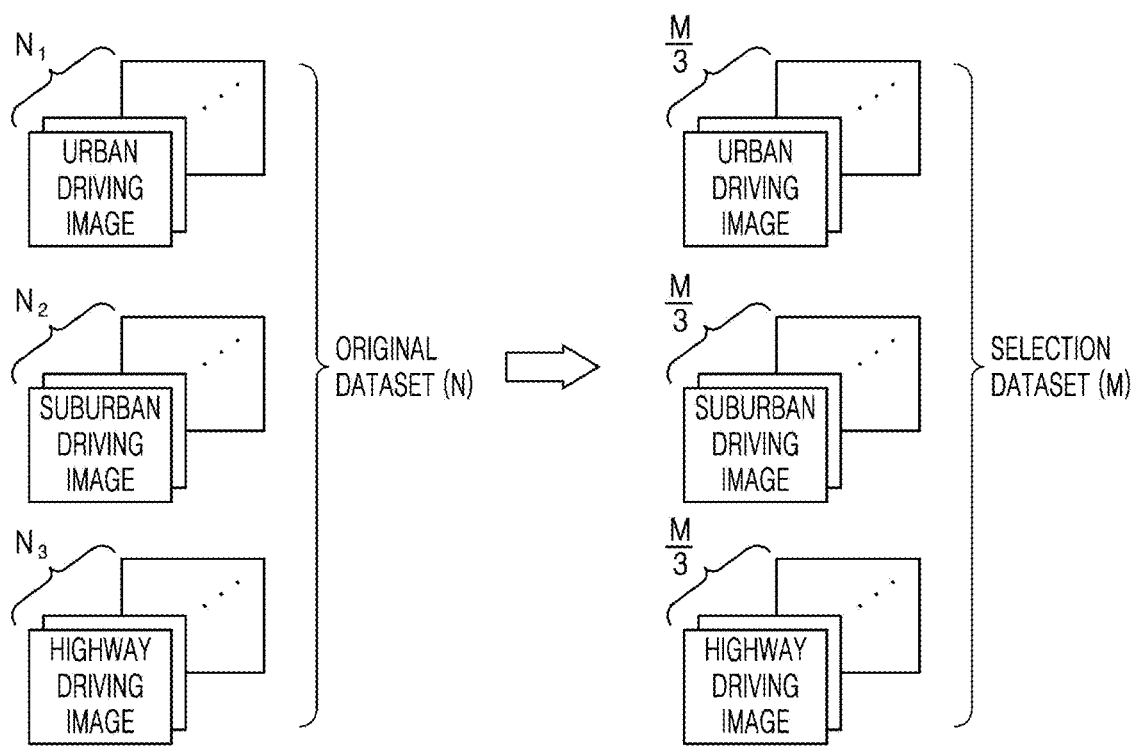
FIG. 1 schematically shows a predetermined number of data selected from a plurality of data included in an original dataset according to one embodiment of the present invention.

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

FIG. 1 schematically shows a predetermined number of data selected from a plurality of data included in an original dataset according to one embodiment of the present invention.

As shown in FIG. 1, an original dataset that is directly retained by an entity that desires to construct learning data to train a machine learning model, such as a company, or provided from an outside may include a plurality of data. Hereinafter, the number of data included in the original dataset will be set as N, and N may correspond to a natural number that is greater than or equal to 2. In addition, the data included in the original dataset may be understood as corresponding to raw data described above.

Meanwhile, the original dataset may include various data. For example, when the original dataset is to be used for training a machine learning model for autonomous driving, the original dataset may include $N_1$ urban driving images, $N_2$ suburban driving images, and $N_3$ highway driving images, and a value obtained by adding all of $N_1$, $N_2$, and $N_3$ may correspond to N.

Proportions of the data included in the original dataset, that is, proportions of $N_1$, $N_2$, and $N_3$ may be different from each other. For example, in the original dataset, the proportion of $N_1$ may be 70%, the proportion of $N_2$ may be 25%, and the proportion of $N_3$ may be 5%, and when an entire original dataset configured to have the above proportions is used as the learning data, the machine learning model may be inevitably trained to be biased toward urban driving.

Therefore, according to the present invention, a process for selecting data to be used as learning data among a plurality of data included in an original data may be performed so that the machine learning model may be trained to meet target performance.

In detail, according to the present invention, M data (where M is a natural number that is less than N) among N data included in the original dataset may be selected. A set of the data selected as described above may be included in a selection dataset, and the selection dataset may include, for example, data having the same proportion for each type. As in the example described above, while the machine learning model processes the autonomous driving, when it is effective to perform the training with learning data in which $N_1$ to $N_3$ have the same proportion, or an entity that retains the original dataset sets the proportions of $N_1$ to $N_3$ to be the same, the selection dataset may include M/3 urban driving images, M/3 suburban driving images, and M/3 highway driving images.

As describing above, instead of performing the training with the original dataset, the selection dataset selected from the original dataset may be constructed as the learning data to train the machine learning model according to the present invention, so that a time required for the training may be reduced, and performance of the machine learning model may be improved.

Meanwhile, according to the present invention, the selection of the data from the original dataset is not limited to selection performed such that data for each type have the same proportion as in the example described above. For example, the selection of the data from the original dataset may be understood as corresponding to one of various selection schemes such as exclusion of data that is unnecessary for training the machine learning model when the unnecessary data is included in the original dataset, or selection of data in which a proportion of data for each type is arbitrarily set.

Figure 2:
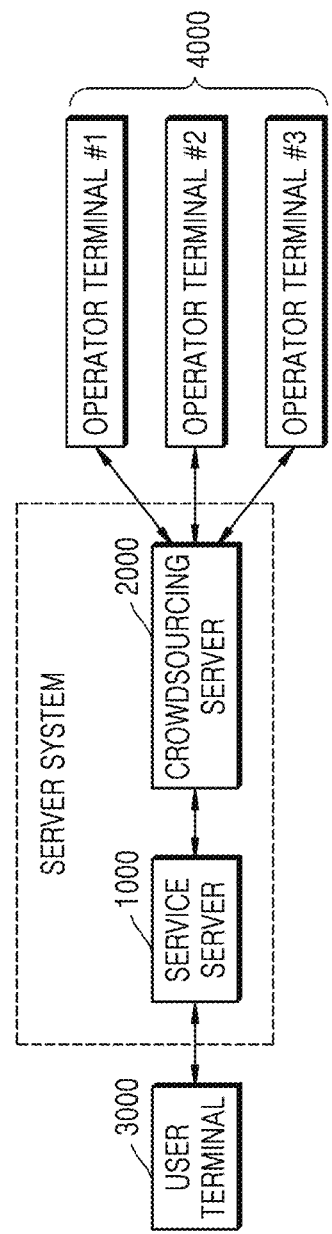
FIG. 2 schematically shows components for performing a method for selectively extracting data for labeling according to one embodiment of the present invention.

FIG. 2 schematically shows components for performing a method for selectively extracting data for labeling according to one embodiment of the present invention.

As shown in FIG. 2, according to the present invention, a method for selectively extracting data for labeling may be performed by a service server 1000, and in order to perform the method for selectively extracting the data for the labeling according to the present invention, the service server 1000 may communicate with a user terminal 3000 of the user who desires to train the machine learning model by using the data extracted through the method as the learning data.

In detail, a use entity of the user terminal 3000 may correspond to the user who desires to construct the learning data by using a predetermined number (M) of data, which is extracted from the N data included in the original dataset, and train the machine learning model of the user by using the learning data. Accordingly, the user terminal 3000 may provide the original dataset to the service server 1000, and the service server 1000 may extract some of the N data included in the received original dataset and provide a result of the extraction to the user terminal 3000.

The service server 1000 may perform the method for selectively extracting the data for the labeling according to the present invention, and may visually display an extraction result on a separate interface to provide the interface to the user terminal 3000. An internal configuration of the service server 1000 will be described in detail with reference to FIG. 3 that will be described below.

Meanwhile, as described above, the service server 1000 may provide a selection result for the M data extracted from the original dataset to the user terminal 3000, and additionally, the service server 1000 may transmit a selection dataset including the selected M data or M data that are finally selected by the user terminal 3000 to a crowdsourcing server 2000.

The crowdsourcing server 2000 may perform the labeling (operation) on each of the M data through crowdsourcing in order to process a plurality (M) of data included in the selection dataset provided from the service server 1000, that is, in order to perform the labeling on each of the M data, and may provide the M data labeled through the crowdsourcing to the user terminal 3000 through the service server 1000 or directly provide the M data labeled through the crowdsourcing to the user terminal 3000.

In more detail, the crowdsourcing server 2000 may communicate with a plurality of operator terminals 4000 in order to label the data in a crowdsourcing scheme, and may provide the selected M data to the operator terminals 4000, respectively.

Meanwhile, the operator terminals 4000 may receive some of the M data that are operation targets from the crowdsourcing server 2000, and may transmit data labeled according to an input of an operator to the crowdsourcing server 2000. As described above, the crowdsourcing server 2000 may collect the data (labeled data) processed by the operators through the crowdsourcing and provide the collected data to the service server 1000 or the user terminal 3000, so that the user may use the data that has been subject to an operation as the learning data.

As described above, although the service server 1000 and the crowdsourcing server 2000 have been shown in FIG. 2 as being included in a server system, according to another embodiment of the present invention, the crowdsourcing server 2000 may be included in an external system that is different from the system including the service server 1000.

In addition, according to another embodiment of the present invention, the crowdsourcing server 2000 may not correspond to a separate server, in which the service server 1000 may additionally perform an operation performed by the crowdsourcing server 2000, or internal components included in the crowdsourcing server 2000 may be additionally included in the service server 1000.

Figure 3:
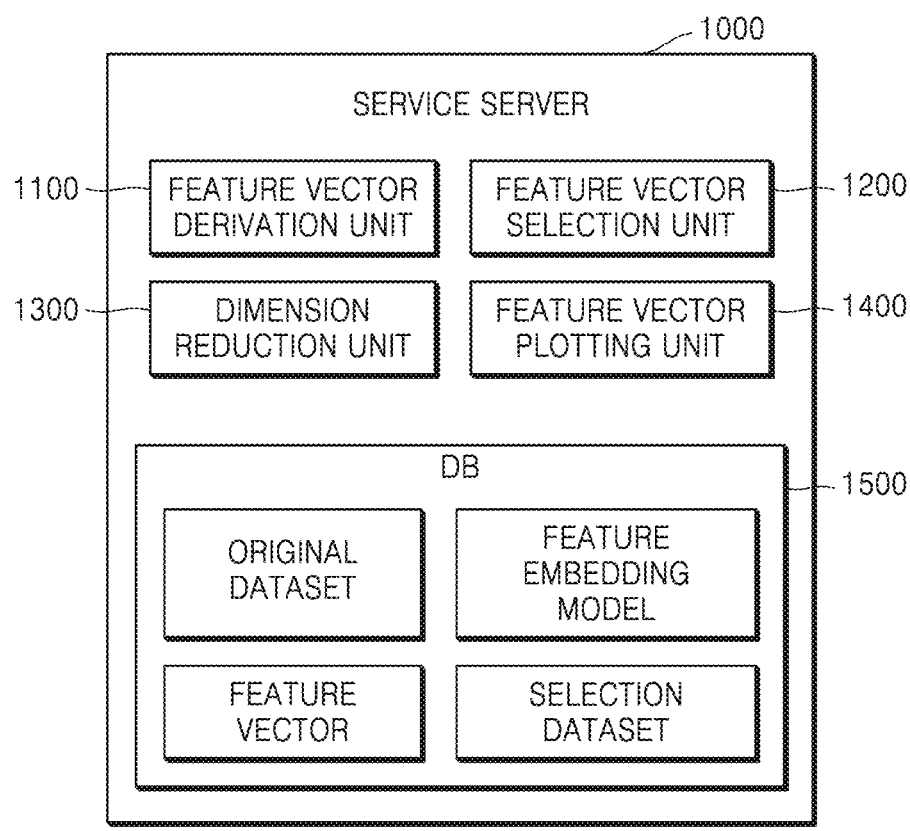
FIG. 3 schematically shows internal components of a service server according to one embodiment of the present invention.

FIG. 3 schematically shows internal components of a service server 1000 according to one embodiment of the present invention. As shown in FIG. 3, in order to perform the method for selectively extracting the data for the labeling according to the present invention, the service server 1000 may include a feature vector derivation unit 1100, a feature vector selection unit 1200, a dimension reduction unit 1300, a feature vector plotting unit 1400, and a DB 1500.

In detail, the feature vector derivation unit 1100 may perform a feature vector derivation step S100, and may derive a feature vector for each of the N data included in the original dataset provided from the user terminal 3000 of the user. In more detail, the feature vector derivation unit 1100 may use a feature embedding model to input the N data to the feature embedding model so as to derive the feature vector for each of the N data. The feature vectors may be used to select a predetermined number of data by the feature vector selection unit 1200 that will be described below.

The feature vector selection unit 1200 may perform a feature vector selection step S110, and may select a preset number (M) of feature vectors among the N feature vectors derived through the feature vector derivation unit 1100. In more detail, the feature vector selection unit 1200 may determine a position of each of the feature vectors according to values of the N feature vectors for each dimension, and may select M feature vectors according to a preset rule based on the position of each of the feature vectors. The above configuration will be described below with reference to FIGS. 7 and 8.

The dimension reduction unit 1300 may perform a dimension reduction step S120, and may reduce dimensions of the N feature vectors, more specifically, the selected M feature vectors and unselected (N-M) feature vectors to three or less dimensions. As described above, the dimension reduction unit 1300 may reduce the dimension of the feature vector to a predetermined dimension or less, so that the position of the feature vector may be visually displayed.

The feature vector plotting unit 1400 may plot each of the N feature vectors having the dimensions that are reduced by the dimension reduction unit 1300 on a plane. For example, when the dimension reduction unit 1300 reduces the dimensions of the N feature vectors to three dimensions, the feature vector plotting unit 1400 may display the N feature vectors with the reduced dimensions on a plane having three axes, and when the dimension reduction unit 1300 reduces the dimensions of the N feature vectors to two dimensions, the feature vector plotting unit 1400 may display the N feature vectors with the reduced dimensions on a plane having two axes. In addition, the feature vector plotting unit 1400 may provide a visualization interface 1410 including the plane on which the N feature vectors with the reduced dimensions are displayed to the user terminal 3000, and may allow the user to visually recognize an extraction result for the selected data, and additionally, the feature vector plotting unit 1400 may allow the user to modify the selected M data.

The DB 1500 may store information derived by the service server 1000 or received by the service server 1000 from an external component such as the user terminal 3000 in order to perform the method for selectively extracting the data for the labeling according to the present invention. For example, the DB 1500 may store the original dataset provided from the user terminal 3000, the feature embedding model used by the feature vector derivation unit 1100 to derive the feature vector for each of the N data included in the original dataset, the feature vector derived by the feature vector derivation unit 1100, and the M data selected by the feature vector selection unit 1200 or the selection dataset including the M data that are finally selected according to the modification of the user.

Figure 4:
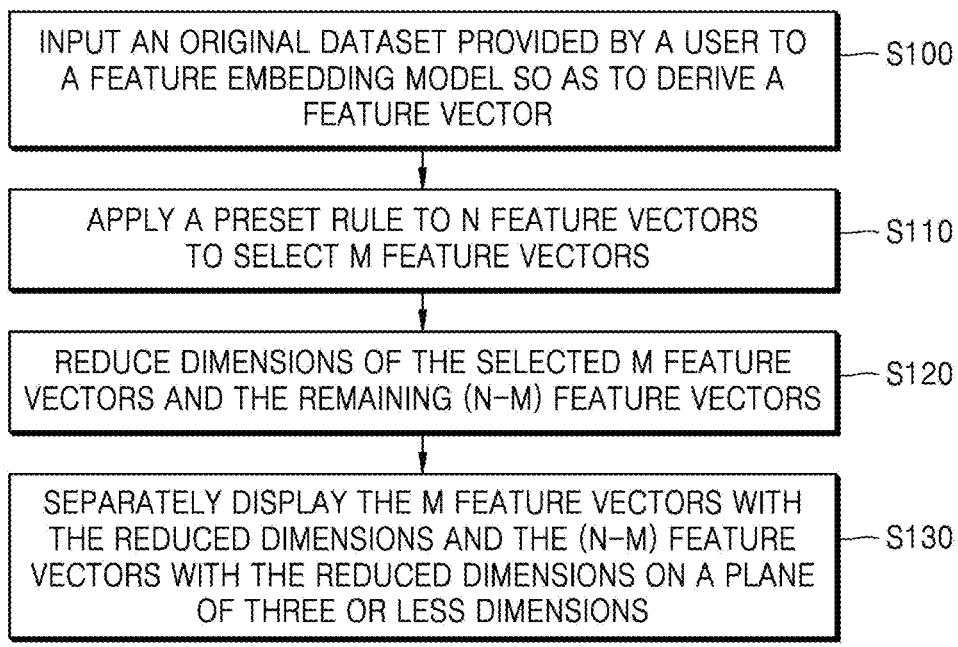
FIG. 4 schematically shows detailed steps of the method for selectively extracting the data for the labeling according to one embodiment of the present invention.

FIG. 4 schematically shows detailed steps of the method for selectively extracting the data for the labeling according to one embodiment of the present invention.

As shown in FIG. 4, the method for selectively extracting the data for the labeling, which is performed by the service server 1000 including at least one processor and at least one memory, may include: a feature vector derivation step S100 of inputting an original dataset including N data (where N is a natural number that is greater than or equal to 2) provided by a user to a feature embedding model to derive a feature vector for each of the N data; a feature vector selection step S110 of applying a preset rule to the N feature vectors derived in the feature vector derivation step S100 to select M feature vectors (where M is a natural number that is less than N) among the N feature vectors; a dimension reduction step S120 of reducing dimensions of the M feature vectors selected through the feature vector selection step S110 and remaining (N-M) feature vectors that are not selected to a three or less dimensions; and a feature vector plotting step S130 of separately displaying the M feature vectors with the reduced dimensions and the (N-M) feature vectors with the reduced dimensions on a plane of the three or less dimensions.

In detail, in the feature vector derivation step S100, the N data included in the original dataset that is directly or indirectly provided by the user may be input to the feature embedding model so as to derive a feature vector having K dimensions (where K is a natural number that is greater than or equal to 2).

In more detail, the original dataset may be transmitted by the user to the service server 1000 through the user terminal 3000, or the original dataset may be provided by the user from the service server 1000 through a computer-readable medium such as a USB in which the original dataset is stored. Meanwhile, the feature embedding model may be a machine learning model that receives predetermined data and derives a feature vector having K dimensions as a result of the reception. In detail, the feature vector may have K components, and a number of the components may be understood as corresponding to a number of dimensions. The feature embedding model will be described below with reference to FIGS. 5 and 6.

In the feature vector selection step S110, the preset rule may be applied to the N feature vectors derived through the feature vector derivation step S100 to select a predetermined number (M) of feature vectors. In more detail, in the feature vector selection step S110, a total of M feature vectors may be selected by determining positions of the N feature vectors in consideration of a value for each of the K dimensions of the feature vector, classifying a plurality of regions in consideration of the positions of the N feature vectors, and selecting a predetermined number of feature vectors for each region. Meanwhile, M that correspond to a number of the feature vectors selected in the feature vector selection step S110 may correspond to a preset value or a value that is set by the user who requests the selection of the data.

In the dimension reduction step S120, the dimensions of the N feature vectors may be reduced to the three or less dimensions. To this end, in the dimension reduction step S120, one scheme among various conventional schemes such as t-distributed stochastic neighbor embedding (T-SNE) and principal component analysis (PCA), which are used to reduce dimensions of a vector, may be used to reduce the dimensions of the feature vector to the three or less dimensions.

In the dimension reduction step S120, the dimensions of the feature vector having the K dimensions may be reduced to the three or less dimensions so as to cause as less loss as possible, and the feature vector with the dimensions reduced as described above may be used to visually display data at a specific position on a plane.

In the feature vector plotting step S130, the N feature vectors having the dimensions reduced through the dimension reduction step S120 as described above may be displayed on the plane of the three or less dimensions, and a display result may be transmitted to the user terminal 3000. In detail, in the feature vector plotting step S130, the N feature vectors with the reduced dimensions may be displayed on the plane, the visualization interface 1410 including the plane on which the N feature vectors with the reduced dimensions are displayed may be provided to the user terminal 3000, and the visualization interface 1410 may be displayed on the user terminal 3000.

As described above, through the visualization interface 1410 displayed on the user terminal 3000, the user may visually recognize a result of the feature vector selected by the service server 1000, and may recognize data for the selected feature vector, and additionally, the user may change the M feature vectors selected by the service server 1000.

Figure 5:
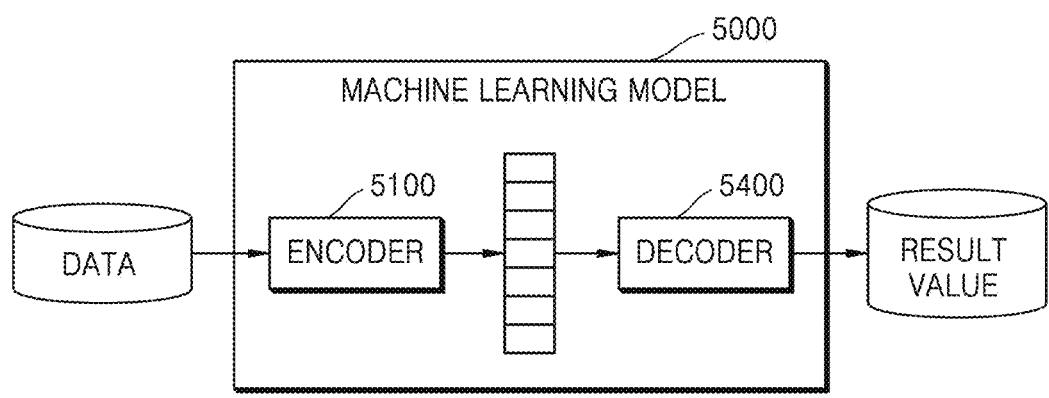
FIG. 5 schematically shows a configuration of a machine learning model used as a feature embedding model according to one embodiment of the present invention.

According to the present invention, since the M data that are suitable for the training are selected among the N data included in the original dataset so as to be provided to the user through the above process, the user may construct the learning data by performing a labeling operation on the selected M data, so that the machine learning model may be effectively trained. FIG. 5 schematically shows a configuration of a machine learning model 5000 used as a feature embedding model according to one embodiment of the present invention.

As shown in FIG. 5, according to one embodiment of the present invention, the feature embedding model used to derive the feature vector for the data in the feature vector derivation step S100 may correspond to a machine learning model 5000 shown in FIG. 5 or one of internal components of the machine learning model 5000.

In detail, the machine learning model 5000 may include an encoder 5100 and a decoder 5200. The encoder 5100 may serve to collect and compress data input to the machine learning model 5000, and the decoder 5200 may serve to decompress the data compressed by the encoder 5100 so that the data derived by the decoder 5200 may correspond to an output (result value) of the machine learning model 5000.

For example, when an image including a dog is input to the machine learning model 5000, the encoder 5100 may receive the image and output information on the image in a vector form, and the decoder 5200 may receive an output of the encoder 5100 and output information for determining whether the image is an image of a dog based on values included in a vector.

Meanwhile, the machine learning model 5000 may be trained by using the learning data so that the encoder 5100 may output a feature vector that may represent information on the input data. In this case, according to the present invention, the feature embedding model may correspond to the encoder 5100 of the trained machine learning model 5000.

Figure 6:
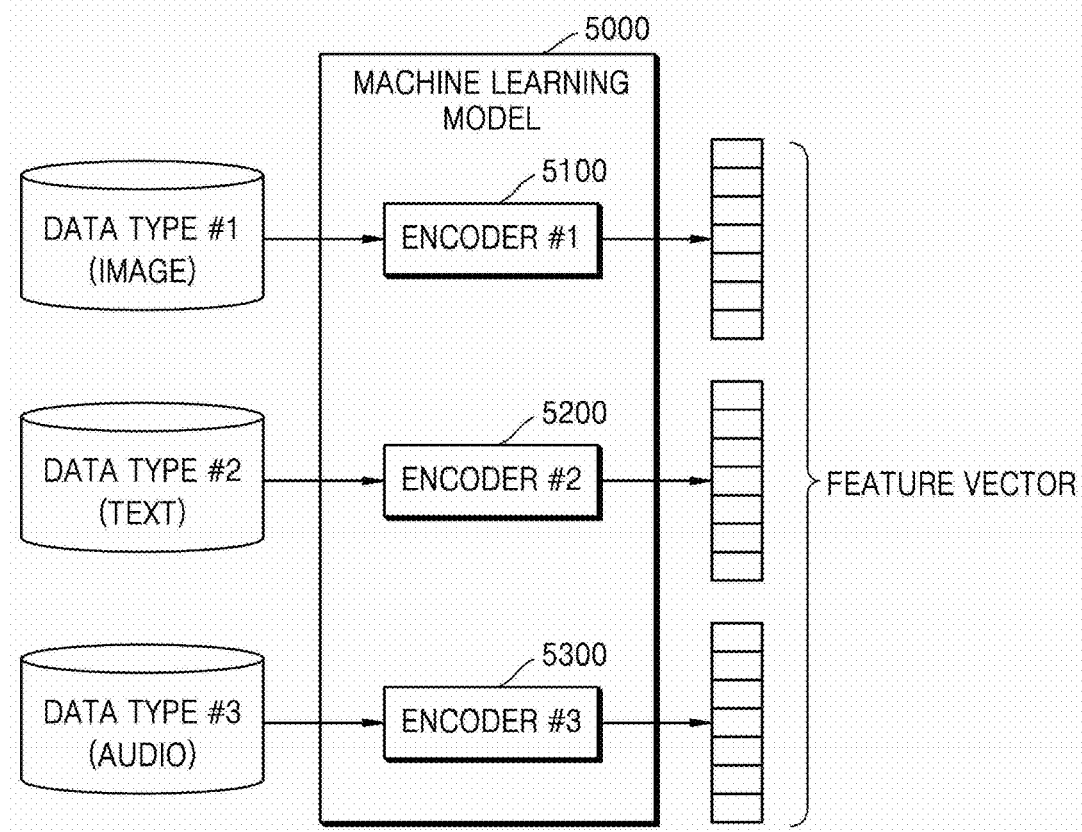
FIG. 6 schematically shows a configuration of a machine learning model used as a feature embedding model according to another embodiment of the present invention.

FIG. 6 schematically shows a configuration of a machine learning model 5000 used as a feature embedding model according to another embodiment of the present invention.

As shown in FIG. 6, the feature embedding model may correspond to one encoder corresponding to a data type of the original dataset in the machine learning model 5000 including a plurality of encoders 5100 to 5300 corresponding to a plurality of data types to derive feature vectors for data of the data types, respectively.

In detail, as shown in FIG. 6, according to another embodiment of the present invention, the feature embedding model used to derive the feature vector for the data in the feature vector derivation step S100 may correspond to a machine learning model 5000 shown in FIG. 6 or one of internal components of the machine learning model 5000.

The machine learning model 5000 shown in FIG. 6 may include a plurality of encoders 5100 to 5300, and the encoders 5100 to 5300 may receive data of specific types corresponding to the encoders 5100 to 5300 and derive feature vectors for the data, respectively. For example, an encoder #1 5100 may receive data in an image form (Data type #1) and derive a feature vector for image data, an encoder #2 5200 may receive data in a text form (Data type #2) and derive a feature vector for text data, and an encoder #3 5300 may receive data in an audio form (Data type #3) and derive a feature vector for audio data. In other words, the machine learning model 5000 shown in FIG. 6 may correspond to a multimodal-based machine learning model 5000 that receives various types of data and derives a feature vector for the received data.

Meanwhile, the machine learning model 5000 may be trained to receive various types of data for the same object and allow the encoders 5100 to 5300 that have derived the feature vectors, respectively, to derive similar feature vectors. For example, when a type of the image data is an image including a dog, a type of the text data is a text including a dog, and a type of the audio data is an audio with a voice pronouncing a dog, the training may be performed such that the encoders #1 to #3 5100 to 5300 for deriving feature vectors for the data may derive similar or identical feature vectors.

As described above, the encoder corresponding to the type of the data included in the original dataset in the trained machine learning model 5000 may correspond to the feature embedding model used in the feature vector derivation step S100. For example, when image data are included in the original dataset, the feature embedding model may correspond to the encoder #1 5100 that receives data of an image type included in the trained machine learning model 5000 and derives a feature vector.

Meanwhile, according to another embodiment of the present invention, when at least two types of data are included in the original dataset, the feature embedding model may be understood as including at least two encoders that process the at least two types of data among the encoders 5100 to 5300 included in the trained machine learning model 5000.

In addition, a number of the encoders 5100 to 5300 included in the multimodal-based machine learning model 5000 is not limited to a number shown in FIG. 6, and the machine learning model 5000 may be understood as including a plurality of encoders including various types of data.

Figure 7:
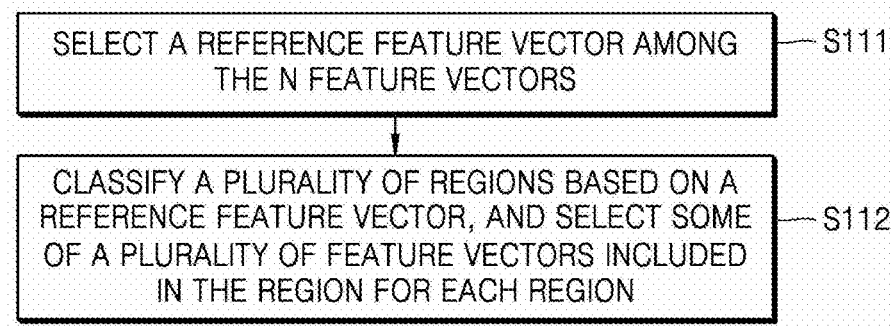
FIG. 7 schematically shows detailed steps of a feature vector selection step according to one embodiment of the present invention.

FIG. 7 schematically shows detailed steps of a feature vector selection step S110 according to one embodiment of the present invention.

As shown in FIG. 7, the feature vector selection step S110 may include: a reference feature vector selection step S111 of selecting a reference feature vector for selecting the M feature vectors among the N feature vectors; and a region selection step S112 of classifying a plurality of regions based on the reference feature vector, and selecting some of a plurality of feature vectors included in the region for each region.

In detail, in the reference feature vector selection step S111, a process for selecting a reference feature vector that is one feature vector serving as a reference among the N feature vectors may be performed, and one scheme among various schemes may be used to select the reference feature vector.

For example, a sum of distances between each of the feature vectors and the remaining feature vectors except for the feature vector may be calculated, and a feature vector having a smallest sum of distances among the sums of the distances calculated for the N feature vectors, respectively, may be selected as the reference feature vector. In addition, an average value for each dimension may be calculated for each of the K dimensions included in each of the N feature vectors, and a feature vector having a smallest error with the average value for each dimension may be selected as the reference feature vector.

In the region selection step S112, the M feature vectors may be selected among the N feature vectors by using the reference feature vector selected through the reference feature vector selection step S111. In more detail, in the region selection step S112, as shown in FIG. 8, the regions may be set based on the reference feature vector, a predetermined number of feature vectors may be selected within the set region, and a number of the selected feature vectors for each region may be set as M.

Figure 8:
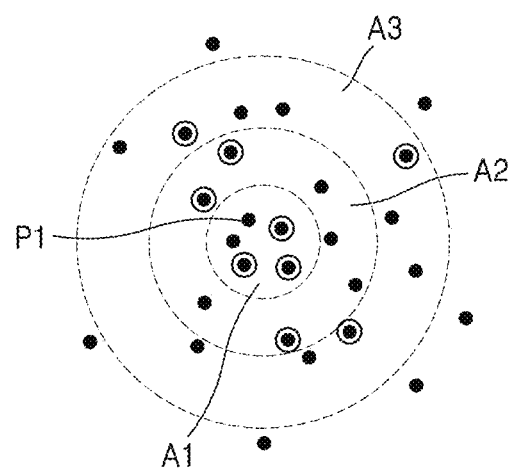
FIG. 8 schematically shows data selected according to a preset rule in the feature vector selection step according to one embodiment of the present invention.

According to an example of FIG. 8, in the region selection step S112, a plurality of circular regions may be set about P1 that corresponds to the reference feature vector. A first region may correspond to A1, which is a circular region with a radius of r about a reference feature vector P1, a second region may correspond to A2, which is a circular region with a radius of 2r about the reference feature vector P1 except for the region A1, and a third region may correspond to A3, which is a circular region with a radius of 3r about the reference feature vector P1 except for the regions A1 and A2. In the region selection step S112, the predetermined number of the feature vectors may be selected for each region set as described above. Three feature vectors have been marked in FIG. 8 as being selected for each region.

The predetermined number of the feature vectors selected for each region in the region selection step S112 may be equally set for each region, may be differentially set to allow, for example, a number of feature vectors selected in a region close to the reference feature vector to be greater than a number of feature vectors selected in a region away from the reference feature vector, or may be determined according to an arbitrary setting of the user.

In addition, various schemes may be applied to a scheme of selecting the feature vector for each region in the region selection step S112. For example, in the region selection step S112, a predetermined number of feature vectors may be arbitrarily selected for each region among the feature vectors included in the region, or a predetermined number of feature vectors may be selected from a region in which a plurality of feature vectors are densely formed to form a sort of a group in consideration of positions of the feature vectors in the region.

Meanwhile, the drawing in FIG. 8 has been shown only to visually describe a process for selecting a feature vector. When the N feature vectors have multidimensional components of four or more dimensions, instead of selecting the feature vectors by locating the N feature vectors on a plane, selecting the reference feature vector, and visually setting the region as in FIG. 8, a process for selecting a reference feature vector and selecting a feature vector for each region based on the reference feature vector may be performed without performing a process for plotting N vectors on a separate plane by using a mathematical scheme.

Figure 9A:
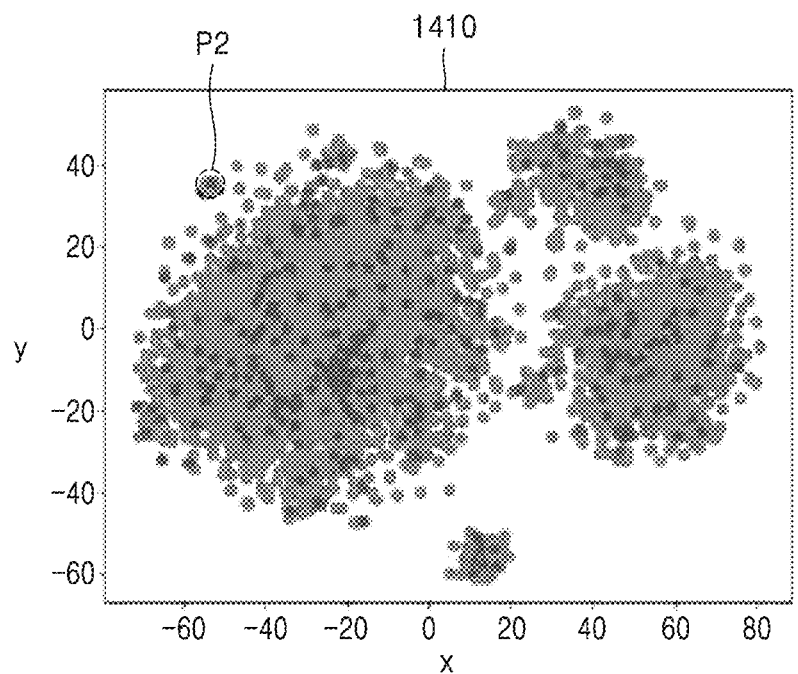
FIGS. 9A and 9B schematically show a visualization interface displayed on a terminal of a user according to one embodiment of the present invention.
Figure 9B:
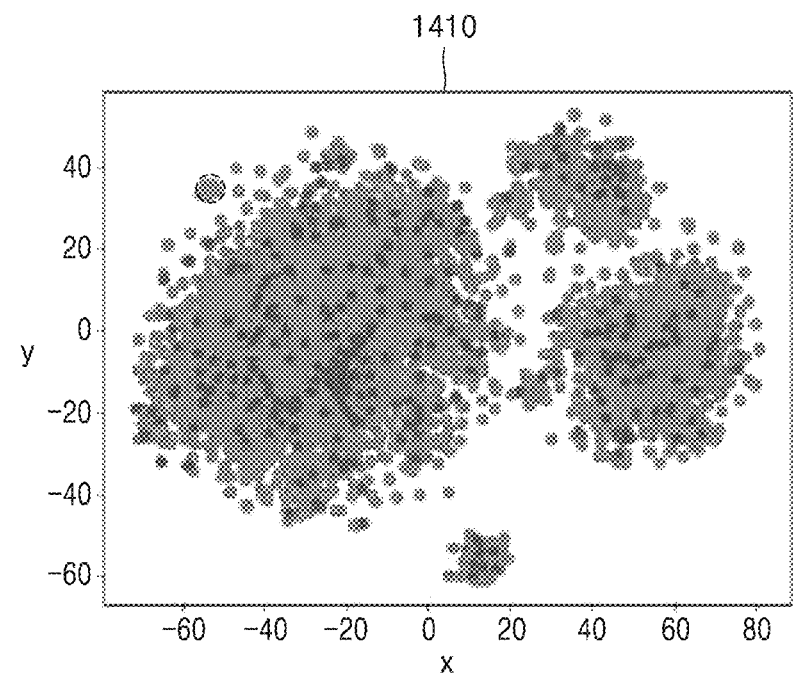

FIGS. 9A and 9B schematically show a visualization interface displayed on a terminal of a user according to one embodiment of the present invention.

As shown in FIGS. 9A and 9B, the feature vector plotting step S130 may include a visualization interface provision step of providing a visualization interface 1410 in which the plane of the three or less dimensions including the N feature vectors with the reduced dimensions is visually displayed to the terminal of the user, and the visualization interface 1410 displayed on the terminal of the user may display the M feature vectors with the reduced dimensions in a first color, and display the (N-M) feature vectors with the reduced dimensions in a second color.

In detail, the feature vector plotting step S130 may include the visualization interface provision step, and in the visualization interface provision step, the visualization interface 1410 including the plane of the three or less dimensions on which the N feature vectors having the dimensions reduced to the three or less dimensions in the feature vector plotting step S130, more specifically, the M feature vectors with the reduced dimensions selected through the feature vector selection step S110 and the unselected (N-M) feature vectors with the reduced dimensions are displayed may be provided to the user terminal 3000 of the user.

FIG. 9A schematically shows the visualization interface 1410 displayed on the user terminal 3000 according to one embodiment of the present invention. As described above, the visualization interface 1410 may include the plane of the three or less dimensions including the N feature vectors with the reduced dimensions, and each of the N feature vectors with the reduced dimensions displayed on the plane of the three or less dimensions may be displayed in the first and second colors that are different from each other depending on a selection state in the feature vector selection step S110.

According to an example shown in FIG. 9A, the M feature vectors selected in the feature vector selection step S110 may be displayed in a green color (first color), and the (N-M) feature vectors that are not selected in the feature vector selection step S110 may be displayed in a gray color (second color). Through the configuration described above, the user may easily and visually recognize a selection result for the feature vector.

Meanwhile, the user may perform an input for enlargement or reduction on the visualization interface 1410, and the visualization interface 1410 may enlarge or reduce the plane of the three or less dimensions according to the input, so that the user may recognize the selection result more easily.

Meanwhile, when the user performs an input for changing a selection state for one feature vector among the N feature vectors with the reduced dimensions, which are visually displayed, the visualization interface 1410 displayed on the terminal of the user may change a color previously displayed for the one feature vector into a color that is different from the color previously displayed for the one feature vector among the first color and the second color.

In detail, the user may not only visually view a data selection result in the service server 1000 through the visualization interface 1410 displayed on the user terminal 3000, but also easily modify the data selected by the service server 1000 as shown in FIG. 9B.

In more detail, the user may select one feature vector among the N feature vectors with the reduced dimensions displayed on the visualization interface 1410, may change a state of a selected feature vector into an unselected state when the selected feature vector is a feature vector selected through the service server 1000, and may conversely change a state of the selected feature vector into a selected state when the selected feature vector is a feature vector that is not selected through the service server 1000.

As described above, a change in a selection state of data according to the selection of the user may be displayed on the visualization interface 1410. A feature vector P2 displayed on the visualization interface 1410 shown in FIG. 9A may be the feature vector selected through the service server 1000, and may be displayed in a green color corresponding to the first color. Meanwhile, when the user performs a selection input for changing a selection state for the feature vector P2, a state of the feature vector P2 may be changed into an unselected state, and the change may be displayed as shown in FIG. 9B. In other words, the state of the feature vector P2 may be changed into the unselected state according to the selection of the user, and the feature vector P2 may be displayed in a gray color corresponding to the second color on the visualization interface 1410.

Meanwhile, an opposite case may also be displayed on the visualization interface 1410. In other words, when the user performs a selection input for changing a selection state for a feature vector that is not selected by the service server 1000, a state of the feature vector may be changed into a selected state, so that the feature vector that has been displayed in the gray color, which is the second color, may be displayed in the green color, which is the first color, on the visualization interface 1410.

Through the configuration described above, the user may visually recognize the selection result through the visualization interface 1410, and may easily modify a part of the selected data.

Figure 10:
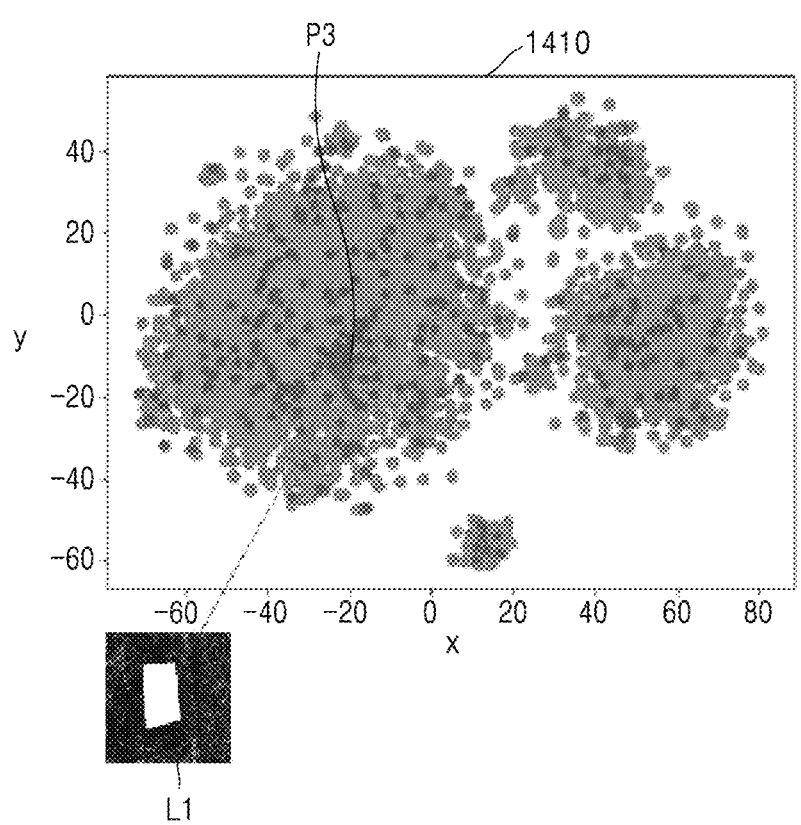
FIG. 10 schematically shows the visualization interface displayed when the user selects one feature vector on the terminal of the user according to one embodiment of the present invention.

FIG. 10 schematically shows the visualization interface 1410 displayed when the user selects one feature vector on the terminal of the user according to one embodiment of the present invention.

As shown in FIG. 10, when the user selects one feature vector among the N feature vectors with the reduced dimensions, which are visually displayed, the visualization interface 1410 displayed on the terminal of the user may display data corresponding to the selected feature vector.

In detail, in order to allow the user to recognize the selection result in the service server 1000 more easily, when the user selects one feature vector on the visualization interface 1410, the visualization interface 1410 may overlay and display data corresponding to the selected feature vector.

In more detail, as shown in FIG. 10, the user may perform a selection input for selecting one feature vector, preferably, a selection input for displaying data for the feature vector on the visualization interface 1410, and a feature vector P3 has been shown in FIG. 10 as being selected by the user.

In this case, a color of the selected feature vector may be changed into a third color that is different from the first and second colors so as to be displayed on the visualization interface 1410. According to an example of FIG. 10, according to a selection input for displaying data performed by the user, a color of the feature vector P3 may be changed into a red color corresponding to the third color that is different from the first and second colors so as to be displayed.

Meanwhile, the visualization interface 1410 may overlay and display a selection data layer L1 on which the data corresponding to the feature vector selected by the user is displayed on the visualization interface 1410. According to the example of FIG. 10, data corresponding to the feature vector P3 selected according to the selection input for displaying the data performed by the user may be displayed on the selection data layer L1.

Through the configuration described above, the user may recognize the data corresponding to the feature vector selected by the user on the visualization interface 1410, so that the user may recognize the selection result in the service server 1000 in more detail, and even in changing the selected data, change target data for the feature vector may be recognized through the selection data layer L1 so that a change state may be determined more easily.

In addition, as shown in FIG. 10, the visualization interface 1410 may not only display the selection data layer L1 for a single feature vector, but also simultaneously overly and display at least two selection data layers L1 for at least two feature vectors according to a selection input of the user.

In addition, although data in an image form has been shown as being displayed on the selection data layer L1 shown in FIG. 10, according to another embodiment of the present invention, the selection data layer L1 may be displayed in various forms according to the types of the data included in the original dataset. For example, when the data included in the original dataset is data in a text form, a text of the data corresponding to the selected feature vector may be displayed on the selection data layer L1, when the data included in the original dataset is data in an audio form, visual elements for reproducing an audio may be displayed on the selection data layer L1, and when the user performs a reproduction input on the selection data layer L1, the audio of the data may be reproduced.

FIG. 11 schematically shows internal components of the computing device according to one embodiment of the present invention.

The service server 1000 shown in the above-described FIG. 2 may include components of the computing device 11000 shown in FIG. 11.

As shown in FIG. 11, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 11 is merely an example of the computing device 11000, and the computing device 11000 may have a configuration or arrangement in which some components shown in FIG. 11 are omitted, additional components not shown in FIG. 11 are further provided, or at least two components are combined. For example, a computing device for a communication terminal in a mobile environment may further include a touch screen, a sensor or the like in addition to the components shown in FIG. 11, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vice versa.

According to one embodiment of the present invention, a preset number of data may be selected among a plurality of data included in an original dataset to provide the selected data to a user, so that the user can selectively provide data for constructing learning data required to train a machine learning model.

According to one embodiment of the present invention, in order to select the preset number of data among the data included in the original dataset, relations among feature vectors for the data may be considered to select the preset number of data, so that the data can be selected more effectively.

According to one embodiment of the present invention, dimensions of feature vectors for the selected data and feature vectors for unselected data among the data may be reduced, and the feature vectors with the reduced dimensions may be displayed on a plane of three or less dimensions, so that the user can easily and visually recognize distribution of the selected data and the unselected data.

According to one embodiment of the present invention, a visualization interface displayed on a terminal of the user may include the plane of the three or less dimensions including the feature vectors with the reduced dimensions, and mutually different colors may be applied to the feature vectors with the reduced dimensions for the selected data and the feature vectors with the reduced dimensions for the unselected data on the plane, so that the user can recognize the distribution of the selected data more effectively.

According to one embodiment of the present invention, the visualization interface displayed on the terminal of the user may include the plane of the three or less dimensions including the feature vectors with the reduced dimensions, and the user may select the feature vector on the plane to cancel selection of a selected feature vector or to select an unselected feature vector, so that the user can arbitrarily change the selected data.

According to one embodiment of the present invention, the visualization interface displayed on the terminal of the user may include the plane of the three or less dimensions including the feature vectors with the reduced dimensions, and when the user selects one feature vector on the plane, data for the feature vector may be displayed on the terminal of the user, so that the user can easily recognize the selected data.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for selectively extracting data for labeling, which is performed by a service server including at least one processor and at least one memory, the method comprising:
    inputting an original dataset including N data (where N is a natural number that is greater than or equal to 2) provided by a user to a feature embedding model so as to derive a feature vector for each of the N data;
    applying a preset rule to the N feature vectors derived in the inputting to select M feature vectors (where M is a natural number that is less than N) among the N feature vectors;
    reducing dimensions of the M feature vectors selected through the applying and remaining (N-M) feature vectors that are not selected to three or less dimensions; and
    separately displaying the M feature vectors with the reduced dimensions and the (N-M) feature vectors with the reduced dimensions on a plane of the three or less dimensions,
    wherein the separately displaying includes providing a visualization interface in which the plane of the three or less dimensions including the N feature vectors with the reduced dimensions is visually displayed to a terminal of the user, and
    the visualization interface displayed on the terminal of the user is configured to display the M feature vectors with the reduced dimensions in a first color, and display the (N-M) feature vectors with the reduced dimensions in a second color, and
    wherein, when the user selects one feature vector among the N feature vectors with the reduced dimensions, which are visually displayed, the visualization interface displayed on the terminal of the user is configured to display data corresponding to the selected feature vector.

2. The method of claim 1, wherein the feature embedding model corresponds to one encoder corresponding to a data type of the original dataset in a machine learning model including a plurality of encoders corresponding to a plurality of data types to derive feature vectors for data of the data types, respectively.

3. The method of claim 1, wherein the applying includes:
selecting a reference feature vector for selecting the M feature vectors among the N feature vectors; and
classifying a plurality of regions based on the reference feature vector, and selecting some of a plurality of feature vectors included in the region for each region.

4. The method of claim 1, wherein, when the user performs an input for changing a selection state for one feature vector among the N feature vectors with the reduced dimensions, which are visually displayed, the visualization interface displayed on the terminal of the user is configured to change a color previously displayed for the one feature vector into a color that is different from the color previously displayed for the one feature vector among the first color and the second color.

5. A service server including at least one processor and at least one memory to perform a method for selectively extracting data for labeling, wherein the service server is configured to perform:
inputting an original dataset including N data (where N is a natural number that is greater than or equal to 2) provided by a user to a feature embedding model so as to derive a feature vector for each of the N data;
applying a preset rule to the N feature vectors derived in the inputting to select M feature vectors (where M is a natural number that is less than N) among the N feature vectors;
reducing dimensions of the M feature vectors selected through the applying and remaining (N-M) feature vectors that are not selected to three or less dimensions; and
separately displaying the M feature vectors with the reduced dimensions and the (N-M) feature vectors with the reduced dimensions on a plane of the three or less dimensions,
wherein the separately displaying includes providing a visualization interface in which the plane of the three or less dimensions including the N feature vectors with the reduced dimensions is visually displayed to a terminal of the user, and
the visualization interface displayed on the terminal of the user is configured to display the M feature vectors with the reduced dimensions in a first color, and display the (N-M) feature vectors with the reduced dimensions in a second color, and
wherein, when the user selects one feature vector among the N feature vectors with the reduced dimensions, which are visually displayed, the visualization interface displayed on the terminal of the user is configured to display data corresponding to the selected feature vector.

6. A computer-readable medium for implementing a method for selectively extracting data for labeling, which is performed by a service server including at least one processor and at least one memory, wherein the computer-readable medium includes computer-executable instructions for allowing the service server to perform:
inputting an original dataset including N data (where N is a natural number that is greater than or equal to 2) provided by a user to a feature embedding model so as to derive a feature vector for each of the N data;
applying a preset rule to the N feature vectors derived in the inputting to select M feature vectors (where M is a natural number that is less than N) among the N feature vectors;
reducing dimensions of the M feature vectors selected through the applying and remaining (N-M) feature vectors that are not selected to three or less dimensions; and
separately displaying the M feature vectors with the reduced dimensions and the (N-M) feature vectors with the reduced dimensions on a plane of the three or less dimensions,
wherein the separately displaying includes providing a visualization interface in which the plane of the three or less dimensions including the N feature vectors with the reduced dimensions is visually displayed to a terminal of the user, and
the visualization interface displayed on the terminal of the user is configured to display the M feature vectors with the reduced dimensions in a first color, and display the (N-M) feature vectors with the reduced dimensions in a second color, and
wherein, when the user selects one feature vector among the N feature vectors with the reduced dimensions, which are visually displayed, the visualization interface displayed on the terminal of the user is configured to display data corresponding to the selected feature vector.

* * * * *